(12) United States Patent
Hoofnagle et al.

(10) Patent No.: US 12,107,751 B2
(45) Date of Patent: Oct. 1, 2024

(54) APPARATUS AND METHOD FOR TESTING NETWORK CABLING IN A COMMUNICATION NETWORK

(71) Applicant: Fluke Corporation, Everett, WA (US)

(72) Inventors: Wayne S. Hoofnagle, Kirkland, WA (US); J. David Schell, Austin, TX (US); Jamie M. Martin, Seattle, WA (US)

(73) Assignee: Fluke Corporation, Everett, WA (US)

( * ) Notice: Subject to any disclaimer, the term of this patent is extended or adjusted under 35 U.S.C. 154(b) by 266 days.

(21) Appl. No.: 17/714,284

(22) Filed: Apr. 6, 2022

(65) Prior Publication Data

US 2022/0321446 A1 Oct. 6, 2022

Related U.S. Application Data

(60) Provisional application No. 63/171,574, filed on Apr. 6, 2021.

(51) Int. Cl.
*H04B 3/46* (2015.01)
*H04L 43/045* (2022.01)
*H04L 43/50* (2022.01)

(52) U.S. Cl.
CPC .............. *H04L 43/50* (2013.01); *H04B 3/46* (2013.01); *H04L 43/045* (2013.01)

(58) Field of Classification Search
CPC .......... H04L 43/50; H04L 43/045; H04B 3/46
USPC ....................................................... 324/539
See application file for complete search history.

(56) References Cited

U.S. PATENT DOCUMENTS

| | | | | |
|---|---|---|---|---|
| 6,631,409 | B1* | 10/2003 | Watson | H04L 43/00 709/224 |
| 9,847,921 | B2* | 12/2017 | Janky | H04B 10/071 |
| 2015/0281024 | A1* | 10/2015 | Janky | H04L 41/22 370/252 |

OTHER PUBLICATIONS

Ramzi, Hamid Abbas. Apparatus for Unshielded Twisted Pair (Utp) Cables Troubleshooting. Diss. University of Khartoum. (Year: 2007).*
Microsoft.com "Network Speed Test", sagarwal-desk01.redmond.corp.microsoft.com, dated Jun. 25, 2013, 1 page.
Google Fiber "Speed Test" obtained Apr. 14, 2021, 1 page.

* cited by examiner

*Primary Examiner* — Christopher P McAndrew
(74) *Attorney, Agent, or Firm* — Seed IP Law Group LLP

(57) ABSTRACT

Apparatus and methods for testing network cabling includes processing circuitry that receives an indication of a user-selected network test of a plurality of network tests. The respective network tests have respective sets of test requirements with different levels of rigor. The test circuitry conducts a wire map test to identify which network tests can be conducted. Thereafter, a common set of test results is produced based on measurement of a common set of parameters pertinent to the network tests that can be conducted. The processing circuitry evaluates the common set of test results with respect to the respective sets of test requirements to determine one or more passing network tests. A plurality of test reports corresponding to the plurality of network tests is graphically displayed along a curve having a common center, wherein each test report indicates whether the corresponding network test is a passing network test.

20 Claims, 6 Drawing Sheets

APPARATUS AND METHOD FOR TESTING NETWORK CABLING IN A COMMUNICATION NETWORK

BACKGROUND

Technical Field

The present disclosure is directed to communication network testing, and in particular to testing network cabling in a communication network.

Description of the Related Art

A network cable tester is used to test the capability of cable connections in a communication network. A network cable tester is capable of troubleshooting problems with network cabling. Conventional testing of cabling in a communication network is conducted only with respect to a specific user-selected test, and the outcome of the testing indicates whether the network cabling has passed or failed the user-selected test. If the network cabling has failed the user-selected test, the user must select an alternative test and conduct additional testing if the user wishes to know whether the network cabling passes the alternative test. Conducting tests in this manner is complex and time consuming.

BRIEF SUMMARY

Described herein are embodiments of apparatus and methods for testing network cabling in a communication network according to multiple network tests. Users are able to quickly understand which network tests have been conducted, and of the network tests conducted, which network tests were passed. The network tests conducted may depend on the wire connections of the network cabling as determined by a wire map test. A network test interface is then generated to provide the results of the network tests.

In various embodiments, the apparatus includes processing circuitry that is configured to receive an indication of a user-selected network test of a plurality of network tests. Each network test includes a set of test requirements that must be satisfied for the network cabling to pass the respective network test. The set of test requirements of each network test has a different level of rigor that the network cabling must satisfy to pass the respective network test as compared to other network tests in the plurality of network tests.

In various embodiments, the apparatus further includes test circuitry and a display. The test circuitry is configured to test the network cabling according to a wire map test, wherein the wire map test is indicative of which network tests of the plurality of network tests can be conducted on the network cabling. The test circuitry produces a common set of test results based on measurement of a common set of parameters that are pertinent to the set of test requirements of each network test that can be conducted according to the wire map test. The processing circuitry is further configured to evaluate the common set of test results with respect to the set of test requirements of each network test being conducted to determine one or more passing network tests.

The display is configured to receive one or more signals that cause the display to generate a network test interface. The network test interface includes a graphical display of a plurality of test reports corresponding to the plurality of network tests. Each test report of the plurality of test reports indicates whether the corresponding network testis one of the one or more passing network tests (i.e., the whether the corresponding network test was passed).

In this manner, the apparatus and methods described herein streamline the process of testing network cabling and enable users to more easily and efficiently conduct multiple network tests and obtain results for faster evaluation.

DETAILED DESCRIPTION

Figure 1:
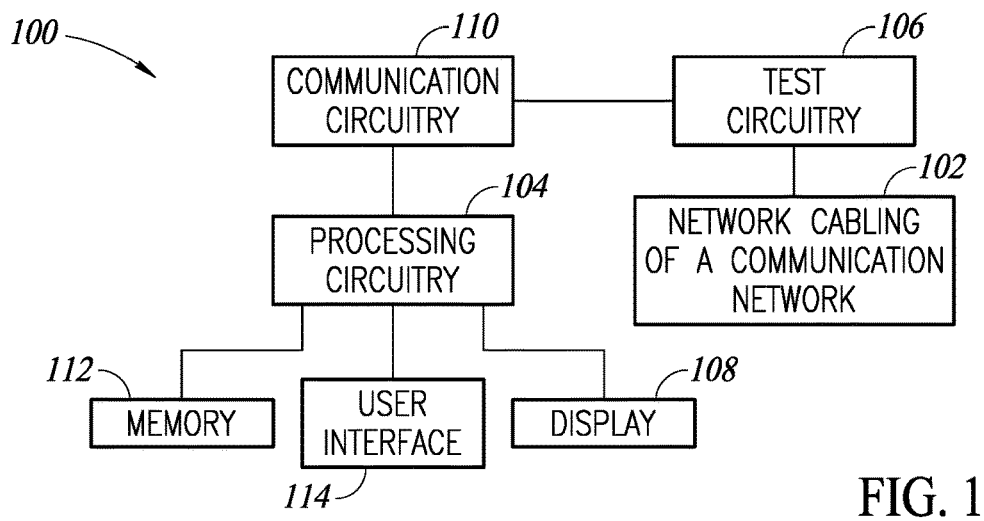
FIG. 1 is a block diagram of an embodiment of apparatus for testing network cabling of a communication network in accordance with the present disclosure.

Testing the physical qualities of network cabling in a communication network can be important to ensure that the network cabling is properly connected and capable of delivering network communications at a desired service level. Common tests for network cabling, which may include copper and/or optical fiber cables, include wire map testing, determining cable length, and testing parameters such as insertion loss, signal attenuation, near-end crosstalk (NEXT), DC loop resistance, delay skew, and return loss, among other parameters. Industry standards provide guidelines that ensure proper installation, troubleshooting, and certifying of network cables for desired network applications.

Network cables may be tested according to a plurality of standards. For example, the standards 10BASE-T, 100BASE-TX, 1GBASE-T, 2.5GBASE-T, 5GBASE-T or 10GBASE-T, are used for testing communication speeds in a communication network. These standards, which may be referenced using a shorthand notation "10," "100," "1G," "2.5G," "5G," and "10G", requires testing of network cabling to determine whether the network cabling meets a specific set of requirements for each network test. Testing of network cabling provides a level of assurance that the network cabling is capable of supporting the desired data communication service level.

Network cable testing typically includes certification, qualification, or verification testing. Certification testing ensures that the network cabling complies with industry standards, and typically indicates "Pass" or "Fail" outcomes in accordance with the industry standards, e.g., standards issued by the Telecommunications Industry Association (TIA) or Electro-technical Commission of the International Organization for Standards (ISO/IEC). Certification is often required by cable manufacturers for warranties on their network cabling to be operative.

Qualification testing typically determines whether network cabling can support certain network speeds and communication throughput. For example, qualification testing can be used to determine whether network cabling will support the set of requirements for, e.g., the 10, 100, 1G, 2.5G, 5G, or 10G standards, or additional standards for Voice over Internet Protocol (VoIP), or Gigabit Ethernet, by way of example. Performing a qualification test allows a technician to identify whether the network cabling is able to provide sufficient bandwidth for the respective network speeds being tested.

Verification testing verifies that network cables are correctly connected. For example, wire map testing confirms whether the wires or cables in a network cabling are connected to the proper termination points and that there are no "split pairs." With twisted pair cabling, proper connection of the pairs of wires is important. Each pair must be connected to the correct pins of the jacks or connectors used to make connections, with good contact in the wire terminations. Wire map tests may use continuity testing to ensure the network cables are properly connected. Verification testing can also include Time Domain Reflectometer (TDR) testing to determine the length of a network cable, or a distance to a break or short in the cabling, for example.

When conducting network testing according to multiple network tests, it is desirable to quickly know which network tests have been conducted, and of the network tests conducted, which network tests were passed. The present disclosure provides apparatus and methods that test network cabling and produce a common set of test results based on a common set of parameters that are pertinent to the test requirements of each network test being conducted. The network tests being conducted may be limited or expanded depending on the wire connections of the network cabling as determined by a wire map test.

Conducting network tests includes evaluating the common set of test results with respect to the test requirements of each network test being conducted. This evaluation is used to determine which network tests are passed. A network test interface is then generated on a display to provide the outcomes of the network tests. In accordance with the present disclosure, the network test interface provides a novel graphical arrangement of test reports that quickly indicate which network tests of the plurality of network tests were conducted, and of the network tests conducted, which network tests were passed.

In some cases, the novel arrangement of the network test interface includes graphically positioning the test reports in the network test interface in a sequence according to an increasing or decreasing level of rigor of the set of test requirements of each respective network test. For example, in embodiments where communication speeds of a network cabling are tested (e.g., according to the 10, 100, 1G, 2.5G, 5G, or 10G standards) and the user has selected one of the network tests as the network test of primary interest to the user, the network test interface may show, in a single view, the plurality of network tests, which network test the user had selected to be tested, and which network tests (e.g., the user-selected test and other tests of higher or lower speeds) were able to be tested, along with a specific indication of whether the network cabling passed or failed at least the network test selected by the user.

The disclosure herein recognizes that the network tests in a group or plurality of network tests may each consider the same underlying measurement data, but have a set of test requirements with differing levels of rigor to be satisfied in order to pass the respective network tests. In other words, the network tests are each evaluated with respect to a common set of parameters that determine whether the respective network tests are passed.

The present disclosure also recognizes that the cabling connections of the communication network may determine whether certain network tests in the plurality of network tests can be conducted. A wire map test of the communication network, which identifies the cabling connections, is thus indicative of which network tests can be conducted.

A technical solution provided herein includes testing the network cabling of a communication network according to a wire map test of the cables that form the communication network. The results of the wire map test are indicative of which network tests of a plurality of network tests can be conducted. The network testing produces a common set of test results according to a common set of parameters that are pertinent to the test requirements of each network test that can be conducted according to the wire map test. Based on the test results, the network testing determines which network tests are passed, of the network tests conducted. This is done by evaluating the test results with respect to the common set of test requirements of each network test conducted.

The technical solution further provides a network test interface that graphically displays, in a single view, a plurality of test reports corresponding to the plurality of network tests. Each test report indicates whether the corresponding network test was passed. This includes the user-selected network test. If in the plurality of network tests there is at least one network test having a greater level of rigor than the user-selected network test, at least one of the test reports in the network test interface may indicate whether the network cabling passed the network test having the greater level of rigor.

Technical benefits of the present disclosure include faster processing of a plurality of network tests, with less complexity and greater ease on the part of the user. In a single view, the network test interface provides the user with a plurality of test reports indicating all of the network tests conducted and which of the network tests that the communication network passed. Where possible, the network test interface also provides the user with additional knowledge whether the network cabling was able to pass a network test of greater rigor than the user-selected network test. This aspect provides the user with additional knowledge of the capabilities of the communication network and peace of mind knowing the network cabling has capabilities beyond the requirements of the network test that the user had selected.

FIG. 1 depicts a block diagram of at least one embodiment of an apparatus 100 for testing network cabling 102 of a communication network. The apparatus 100 may include processing circuitry 104, test circuitry 106, and a display 108. The apparatus may further include communication circuitry 110 for communication of instructions and data between the processing circuitry 104 and the test circuitry 106. The processing circuitry 104 may further be communicatively coupled to a memory 112 and a user interface 114.

The memory 112 may store and retrieve executable instructions as well as data for use by the processing circuitry 104. When retrieved and executed by the processing circuitry 104, the executable instructions cause the processing circuitry 104 to conduct testing of the network cabling 102 as described herein. The user interface 114 may be configured to receive input from a user. Such user input may include a user's selection of a network test from among a plurality of network tests that can be conducted. The user's selections is indicative of the network test of primary interest to the user for testing the network cabling 102. The apparatus 100 may use one or more patch cables that connect the test circuitry 106 to the network cabling 102 (e.g., at the near end of the network cabling), and remote ID circuitry (not shown) for connection to the far end of the network cabling 102, to enable the testing conducted by the test circuitry 106 and the processing circuitry 104. In this embodiment, the processing circuitry 104 is configured to receive test results of the network tests conducted by the test circuitry 106 via the communication circuitry 110.

The test circuitry 106 is configured to conduct multiple network tests on the network cabling 102. Each network test includes a set of test requirements that the network cabling 102 must satisfy to pass the respective network test. The set of test requirements of each network test has a different level of rigor to satisfy in order for the network cabling 102 to pass the respective network test as compared to other network tests.

The different levels of rigor may reflect or be represented by rules, conditions, and/or thresholds having any one or a combination of levels of difficulty, strictness, tolerance, or precision, that must be met in order to satisfy higher or lower objectively-defined standards. For example, the network cabling 102 may be tested according to a plurality of network tests for testing communication data rates according to the 10, 100, 1G, 2.5G, 5G, or 10G standards. These standards have requirements of increasing rigor, and represent a progression of capability of the network cabling to communicate at increasingly higher data rates. For the network cabling 102 to pass one or more of the 10, 100, 1G, 2.5G, 5G, and 10G standards, the test circuitry 106 measures a set of parameters of the network cabling 102 that is shared by (or common with) each of the standards, and produces a common set of test results based on these measurements. These test results are evaluated to determine whether the network cabling 102 meets the set of requirements specified by each of the respective standards and thereby passes the respective network tests.

When testing network cabling according to a plurality of network tests, e.g., according to the 10, 100, 1G, 2.5G, 5G, and 10G standards, it is possible that not all configurations of the network cabling are capable of being tested according to all of the standards. A wire map test of the network cabling 102 is used to identify the connections, or lack of connections, or defects in the connections, of the network cabling, which can be indicative of which network tests may be conducted. For example, a wire map test may reveal that the network cabling 102 has only four wires connected, or at least four wires properly connected, in the communication network. Such four-wire configurations can be tested according to the 10 and 100 standards, but not any of the higher, more rigorous 1G to 10G standards. In other cases, the wire map test may reveal that the network cabling 102 has eight wires properly connected, and in such configurations, the network cabling may be tested according to all of the 10, 100, 1G, 2.5G, 5G, and 10G standards. Thus, the outcome of a wire map test may be viewed as indicative of which network tests of the plurality of network tests can be conducted on the network cabling 102. The testing of the network cabling is thereafter conducted according to the wire map test, by conducting those network tests that can be conducted as determined from the wire map test.

As noted earlier, each network test has a set of requirements that must be satisfied for the network cabling 102 to pass the respective network test. Because of commonalities of parameters evaluated among the plurality of network tests, a common set of parameters of the network cabling 102 may be measured. Such parameters may include, for example, wire length, attenuation, near-end crosstalk (NEXT), DC loop resistance, and return loss of the network cabling. Thus, the test circuitry 106 may be configured to test the network cabling 102 by measuring a common set of parameters that are pertinent to the set of test requirements of each network test that can be conducted (at least according to a wire map test). The test circuitry 106 produces a common set of test results based on the measurements of the common set of parameters. The common set of test results may be communicated to the processing circuitry 104 for further evaluation.

The processing circuitry 104 is configured to conduct the network tests (that is, the network tests that can be conducted according to the wire map test) by determining, based on the common set of test results produced by the test circuitry 106, which network tests of the plurality of network tests are passed. The processing circuitry 104 determines which network tests are passed by evaluating the common set of test results with respect to the set of test requirements of each network test being conducted, to determine one or more passing network tests. If the set of test requirements of a respective network test are not met, the network test is considered a non-passing network test. In at least some embodiments, when progressing from less rigorous to more rigorous network tests, the processing circuitry 104 is configured to stop evaluating the common set of test results with respect to further network tests when the evaluating determines a non-passing network test.

For example, in cases where the network cabling is being tested according to the 10, 100, 1G, 2.5G, 5G, and 10G standards, the common set of test results produced by the test circuitry 106 (e.g., the measurements of length, attenuation, near-end crosstalk (NEXT), DC loop resistance, and/or return loss) are evaluated according to the test requirements of each of the respective 10BASE-T, 100BASE-TX, 1GBASE-T, 2.5GBASE-T, 5GBASE-T or 10GBASE-T standards. The 10, 100, 1G, 2.5G, 5G, and 10G standards represent a progression of communication capability at increasingly higher data rates, and each of the standards involves a common set of parameters that are judged against increasingly rigorous network test requirements. Measurements of the common set of parameters produce a common set of test results that are evaluated against the increasingly rigorous test requirements in the plurality of network tests. This evaluation of the common set of test results determines whether the network cabling meets the test requirements of the respective standards, including the user-selected standard as well as other standards that are more or less rigorous, to determine one or more passing network tests.

By way of example, a user may have selected the 1G standard, and if the network cabling under test meets the 1G standard, the passing grade for the 1G standard may also be considered as demonstrating that the network cabling meets the test requirements of the less rigorous 10 and 100 standards. Accordingly, in this example, conducting and passing the network test for the 1G standard may be considered as also conducting and passing the network tests for the 10 and 100 standards. As will be discussed in additional detail herein, the common set of test results produced by the test circuitry 106 may also be evaluated with respect to the test requirements of one or more network tests of the plurality of network tests having increasingly more or less rigorous standards than the user-selected network test.

The display 108 coupled to the processing circuitry 104 is configured to receive one or more signals from the processing circuitry 104 that cause the display 108 to generate a network test interface. Various examples of such a network test interface are illustrated and described in FIGS. 2-7. The network test interface includes a graphical display of a plurality of test reports corresponding to the plurality of network tests. The plurality of test reports are graphically positioned in the network test interface in a sequence according to an increasing or decreasing level of rigor of the set of test requirements of each respective network test. Based on the test results, each test report of the plurality of test reports indicates whether the corresponding network test is one of the one or more passing network tests (that is, whether the network cabling passed the corresponding network test of the plurality of network tests).

In some embodiments, the test circuitry 106 is located remote from the processing circuitry 104. The communication circuitry 110 communicates the test results from the test circuitry 106 to the processing circuitry 104 via a wired or wireless communication channel. In other embodiments, the test circuitry 106 and the processing circuitry 104 are located together, e.g., locally on or within a housing.

In at least one embodiment, to conduct testing of network cabling in a communication network, a user powers up the apparatus of the present disclosure and connects one end of a patch cable into a jack on the apparatus. The other end of the patch cable is connected to a jack (or an adapter) coupled to a first end of the cabling under test (e.g., the near end of the cabling). At a second end of the cabling under test (e.g., the far end), the user connects remote ID circuitry designed to interact with test signals communicated by the apparatus via the cabling under test. The user also selects a network test from among a plurality of available network tests as the network test of primary interest to the user. Once fully connected, the user may initiate testing of the network cabling and receive a plurality of test reports in a network test interface as described herein.

FIGS. 2-7 depict embodiments of a network test interface that may be generated in accordance with the present disclosure. The network test interface 200 in FIG. 2, for example, may include an indication 202 of the length of the wire pairs in the network cabling under test. The network test interface 200 may further include an indication 204 of the remote ID circuitry coupled to the end of the network cabling that is opposite to the end of the network cabling coupled to the apparatus 100 conducting the testing. If the remote ID circuitry is detected, the indication 204 may include a checkmark confirming detection of the remote ID circuitry and identify the specific remote ID circuitry that was detected. In this instance, "Remote ID 1" was detected.

Figure 2:
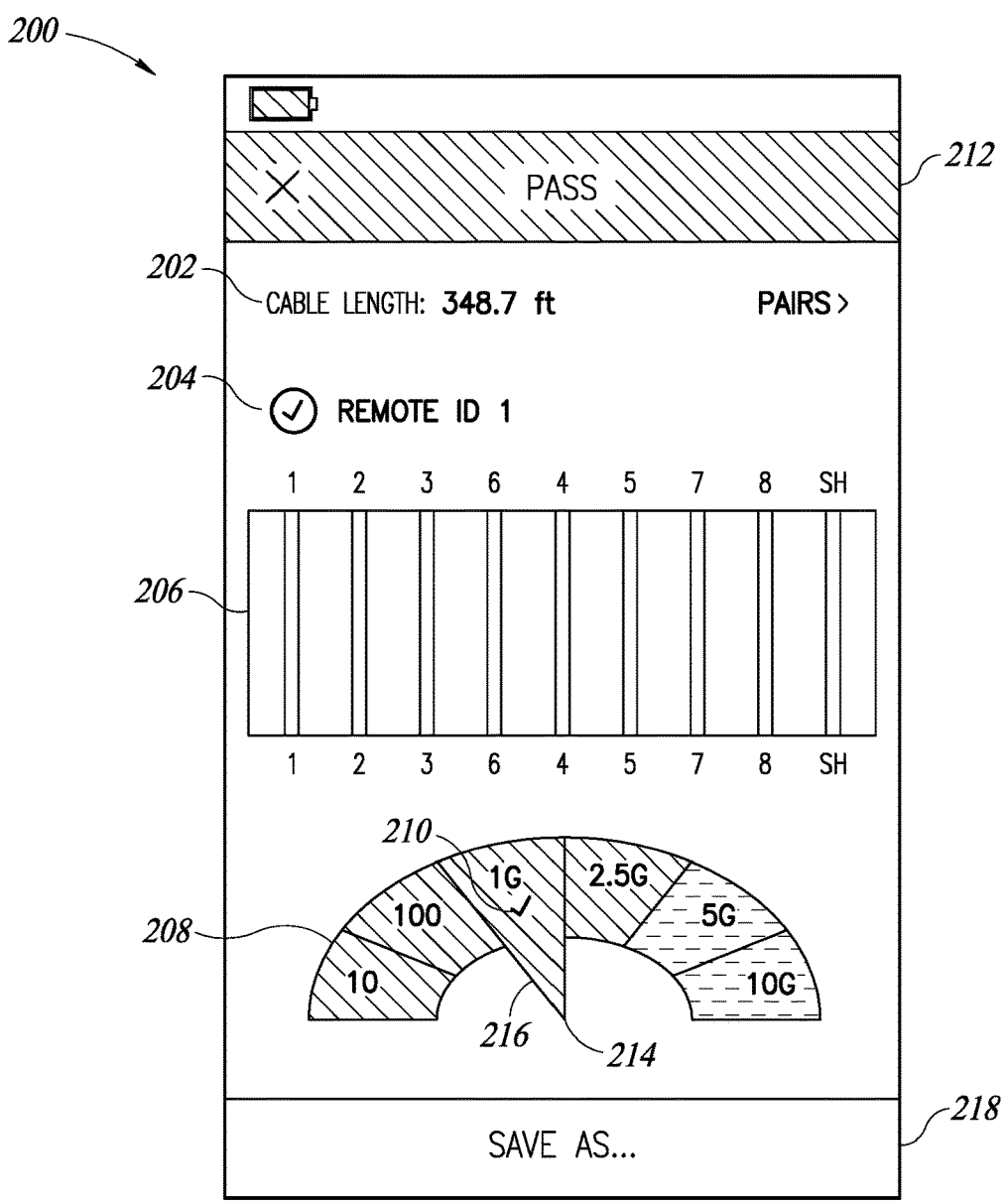
FIG. 2 depicts an embodiment of a network test interface generated in accordance with the present disclosure.

To begin conducting network tests on the network cabling, the apparatus 100 conducts a wire map test of the network cabling and includes the results of the wire map test in the network test interface. For example, as illustrated in FIG. 2, the network test interface 200 may include a graphical depiction of wire map test results 206 showing the connection of wires in the network cabling as determined by the wire map test. The different ports or termination points at each end of the wire connections are labeled by numerals 1-8. The label SH indicates a connection of the apparatus 100 to a shield at the other end of the network cabling under test. The wire map test results 206 in this example indicate proper coupling of all eight wires and the shielding of the network cabling under test.

The network test interface 200 further includes a plurality of test reports 208 corresponding to a plurality of network tests that may be conducted on the network cabling. In the depicted embodiment, the test circuitry 106 of the apparatus 100 is configured to evaluate whether the network cabling can support communication speeds according to the 10BASE-T, 100BASE-TX, 1GBASE-T, 2.5GBASE-T, 5GBASE T, and 10GBASE-T standards. Based on this evaluation, a sequence of test reports labeled 10, 100, 1G, 2.5G, 5G, and 10G, is presented, representing increasing communication speeds of the network cabling according to increasingly rigorous requirements of the noted standards. The requirements of each standard are embodied as rules, conditions, and/or thresholds in a set of test requirements for each of the network tests. The test requirements for each network test must be met by the network cabling in order for the network cabling to satisfy the respective standard.

In the plurality of test reports 208, each test report of the plurality of test reports indicates whether the network cabling passed the corresponding network test. Preferably, the plurality of test reports 208 includes at least one test report indicating whether the network cabling passed the network test of primary interest that the user had selected at the outset. The test reports corresponding to the network tests that the network cabling successfully passed (i.e., the one or more passing network tests) may be depicted by, for example, a different color (e.g., green) as opposed to test reports corresponding to network tests that the network cabling did not pass and/or network tests that were not conducted. In at least some embodiments, test reports corresponding to network tests that the network cabling did not pass may be depicted by the color red, for example. In at least some embodiments, test reports corresponding to network tests that were not conducted may be depicted by the color gray.

In the network test interface 200, an additional element may be graphically displayed to further specifically indicate whether the network cabling passed the network test of primary interest that the user had selected. In this example, the user had selected the "1G" network test, and an additional graphical indication 210 (i.e., a check mark) was added to the test report for the 1G network test to indicate that the network cabling passed the 1G network test. Additionally, the network test interface 200 includes a banner 212 indicating PASS with respect to the user-selected test. The banner 212 may additionally have a green or red background, for example, depending on whether the network cabling passed or failed the user-selected network test.

In at least some embodiments, the network test interface 200 is generated such that the plurality of test reports 208 are arranged a single view in which the test reports are graphically positioned in a sequence according to an increasing or decreasing level of rigor of the set of test requirements of each respective network test. For instance, the plurality of test reports 208 may be graphically positioned along a curve having a common center portion 214. In some respects, the graphical arrangement shown in FIG. 2 may be viewed as a type of speedometer for the network cabling under test. The test report corresponding to each network test that is passed appears different than the test reports of other network tests that are not passed or not conducted, e.g., displayed in a different color.

In at least some embodiments, the network test interface 200 may include an additional graphical indication specifically indicating which test report of the plurality of test reports corresponds to the user-selected network test. For instance, an additional graphical indication 216 graphically extends from the test report corresponding to the user-selected network test (here, the 1G test) toward the common center portion 214, e.g., as a triangular-shaped indication.

Preferably, the network test interface 200 includes an additional graphical indication 210 specifically indicating which test report of the plurality of test reports corresponds to the user-selected network test. In the example shown in FIG. 2, this additional graphical indication 210 is positioned within the graphical depiction of the test report corresponding to the user-selected network test. This additional graphical indication 210 may be a checkmark, for example, confirming that the network cabling has passed the user-selected network test. In instances where the network cabling failed the user-selected network test, the additional graphical indication 210 may be an "X", for example.

The plurality of test reports 208 in the network test interface 200 may further include at least one test report indicating whether the network cabling passed a network test having a greater level of rigor than the user-selected network test. In the example shown in FIG. 2, where the 1G network test is depicted as the user-selected network test, the plurality of test reports 208 further reports that the 2.5G network test was also conducted and the network cabling passed the 2.5G network test. This is illustrated, for example, by depicting the test report for the 2.5G test in the color green, similar to the color green used to indicate that the network cabling passed the 10, 100, and 1G network tests.

Thus, in embodiments of the apparatus according to the present disclosure, while the user has selected a network test as the network test of primary interest (in this case, the 1G network test), the apparatus 100 is configured to automatically conduct a network test having greater rigor that the user-selected network test, in this case the 2.5G network test. In conducting the 2.5G network test, the apparatus has discovered that the network cabling under test was able to pass the more rigorous 2.5G network test.

In some embodiments, when a network test of greater rigor is passed, the apparatus may be configured to automatically conduct yet further network tests having yet greater rigor. For example, having conducted the 2.5G network test and discovering that the network cabling passed the set of test requirements of the 2.5G network test, the apparatus may proceed to conduct the 5G network test. In other embodiments, the apparatus may be configured to conduct only one additional network test of greater rigor than the user-selected network test. By conducting the additional network test and providing the passing scope to the user, the user is provided additional assurance that the network cabling has capabilities beyond the network test of primary interest, thus leaving additional margin for further development of the communication network when higher speeds may be required.

As noted, in FIG. 2, the network tests labeled 10, 100, 1G, and 2.5 are colored differently than the network tests labeled 5G and 10G. In this example, the network tests labeled 10, 100, 1G, and 2.5 were all conducted and the network cabling passed each of these conducted network tests. The network tests labeled 5G and 10G are indicated as not conducted or not applicable. If the 5G and 10 G network tests were conducted and failed, the plurality of test reports 208 would indicate such by a different color, as described herein.

Having reviewed the network test interface 200, the user of the apparatus 100 may decide that the results are satisfactory and save the results in the memory 112, by activating the user interface 114. The user interface 114, in this regard, may be a selectable button 218 included in the display of the network test interface 200, e.g., as a touchscreen element.

The wire map test conducted by the apparatus 100 may indicate which network tests of the plurality of network tests can be conducted on the network cabling. The testing of the network cabling in this regard produces a common set of test results that are evaluated with respect to the set of test requirements of each network test being conducted. Because the test results are common (or applicable) to more than one (or all) of the network tests of the plurality of network tests, the apparatus 100 may measure the appropriate parameters of the network cabling and produce the common set of test results independent of the user's selected network test. In other words, the common set of test results can be produced without regard to the specific network test that the user had selected. The apparatus 100 may first evaluate the common set of test results with respect to the set of test requirements of the user's selected network test, and if the test requirements of the user's selected network test are met (i.e., the selected network test is a passing network test), the apparatus 100 may consider all of the network tests having less rigorous test requirements as also being conducted and met (with the corresponding network tests shown as being passing network tests). The apparatus 100 may then automatically evaluate the common set of test results with respect to at least one network test having greater rigor than the user's selected network test, as previously described, to determine whether the network test is a passing or non-passing network test.

Figure 3:
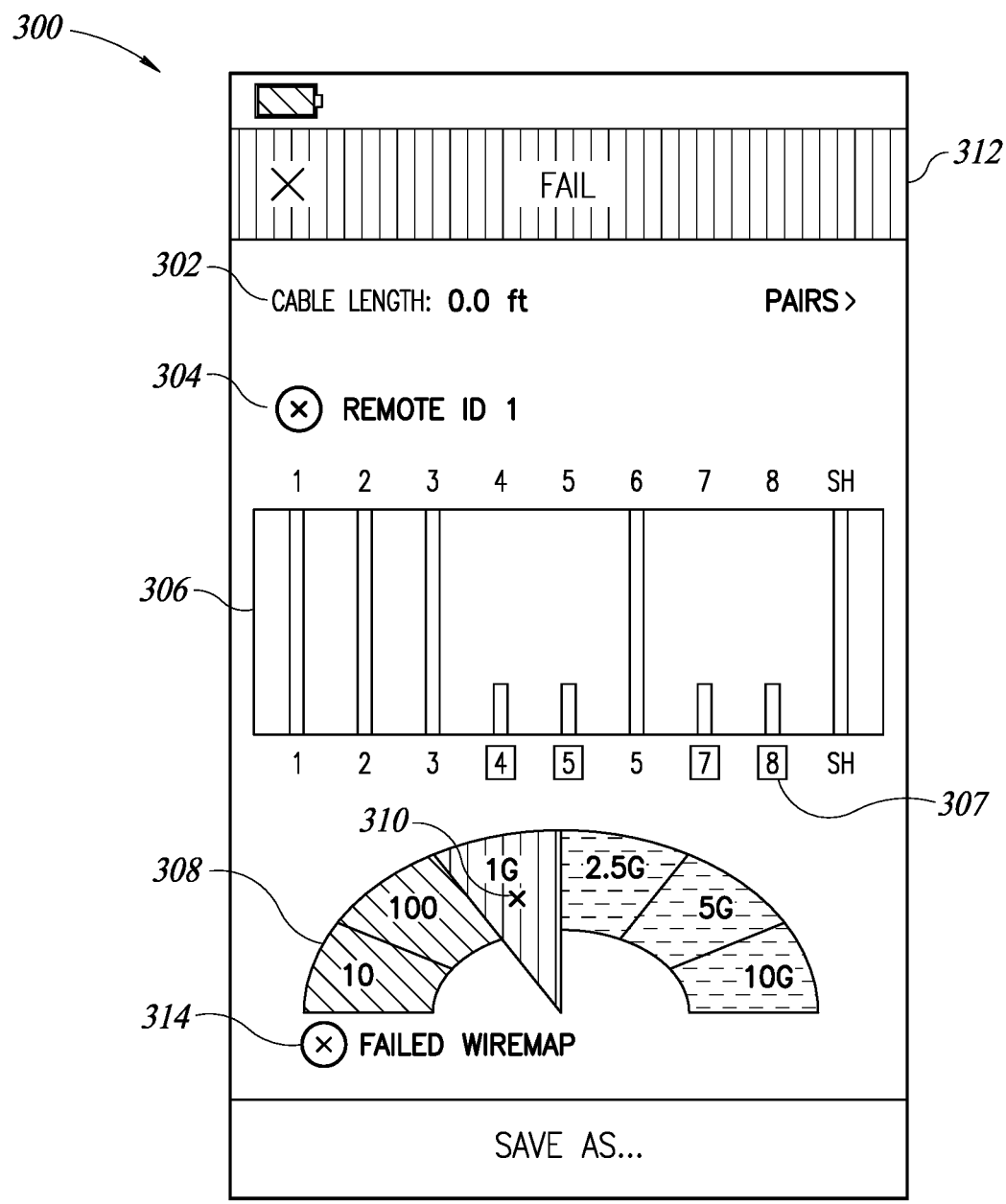
FIG. 3 depicts another embodiment of a network test interface generated in accordance with the present disclosure.

FIG. 3 illustrates another network test interface 300 which, similar to the network test interface 200, includes an indication 302 of cable length and an indication 304 of remote ID circuitry detected at the other end of the network cabling. The network test interface 300 further includes wire map test results 306 revealing that the wire map test of the network cabling detected certain wires of the network cabling connected to the apparatus 100 but not properly terminated at the far end. In this example, small boxes 307 have been placed around the labels "4", "5", "7", and "8" to identify the wires having a faulty or incorrect connection.

In some embodiments, if the wiring of the network cabling is shown to include faulty or incorrect connections, the apparatus 100 may be configured to not conduct testing of the length of the network cabling, and include an indication 302 of a cable length of zero. In other embodiments, the apparatus 100 may be configured to report the length of the shortest pair of wires in the network cabling that are properly connected or potentially not connected.

In some embodiments, an additional indication such as an "X" may be included with the indication 304 of the remote ID circuitry to report that the apparatus 100 detects the remote ID but that the network cabling failed the wire map test. Additionally, or in place of the indication 304, a separate indication 314 of failure of the wire map may be provided.

The network test interface 300 further includes a plurality of test reports 308 that, similar to the plurality of test reports 208 of the network test interface 200, indicate which network tests of the plurality of network tests have been conducted, and which network tests have passed or failed. In the example illustrated in FIG. 3, the plurality of test reports 308 indicates that the network tests 10 and 100 were conducted and passed but that the network cabling failed the user-selected network test 1G, which is indicated by an "X" 310. The failure of the network cabling to pass the user-selected network test is also illustrated by the banner 312. In this example, the network tests 2.5G, 5G, and 10G were not conducted or were not applicable. In this instance, the apparatus 100 was not configured to automatically conduct a network test of greater rigor (e.g., the 2.5G network test) than the user-selected 1G network test.

Figure 4:
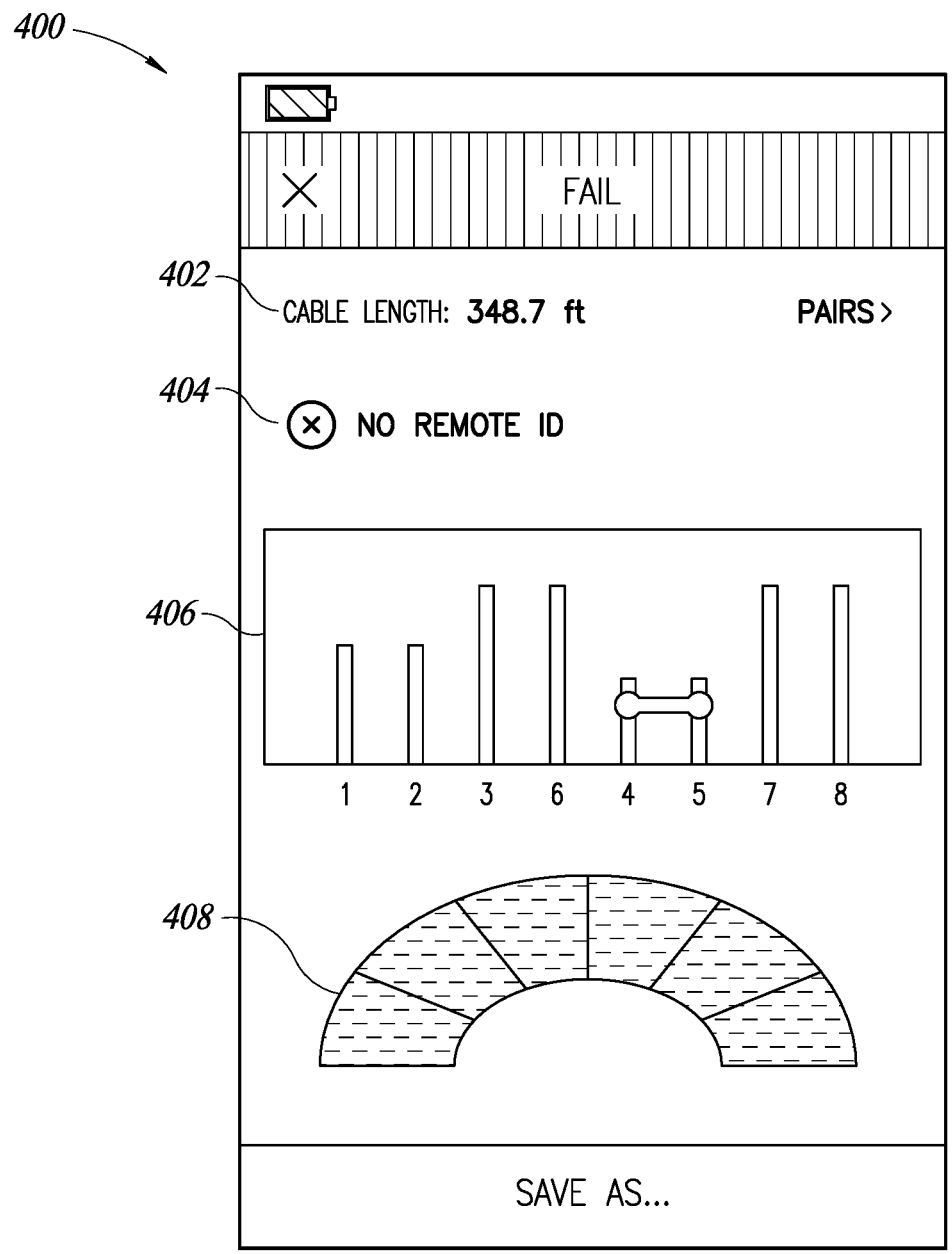
FIG. 4 depicts another embodiment of a network test interface generated in accordance with the present disclosure.

FIG. 4 illustrates another example of a network test interface 400. In this example, the wire map test results 406 reveal that the wire map test detected certain wires of the network cabling connected to the apparatus 100 but none of the wires were properly terminated at the far end of the network cabling. The wire map test results 406 also reveal a short detected across a pair of the wires labeled "4" and "5".

The network test interface 400 includes an indication 402 of cable length. In this instance, where the wires of the network cabling were not properly terminated or otherwise had defects that left the wire connections open, the indication 402 of cable length may report the length of the longest pair of wires of the network cabling to the open or faulty connection of the pair of wires. In other instances, the apparatus 100 may be configured to not conduct a test of cable length when the network cabling has failed the wire map test.

Furthermore, an "X" may accompany the indication 404 indicating that no remote ID circuitry was detected at the far end of the network cabling. Due to the fault in the network cabling, the plurality of test reports 408 indicate that no testing was conducted. In this instance, the individual test reports are blank (i.e. the test reports do not include any labels indicating network tests) and the test reports are colored gray, for example.

Figure 5:
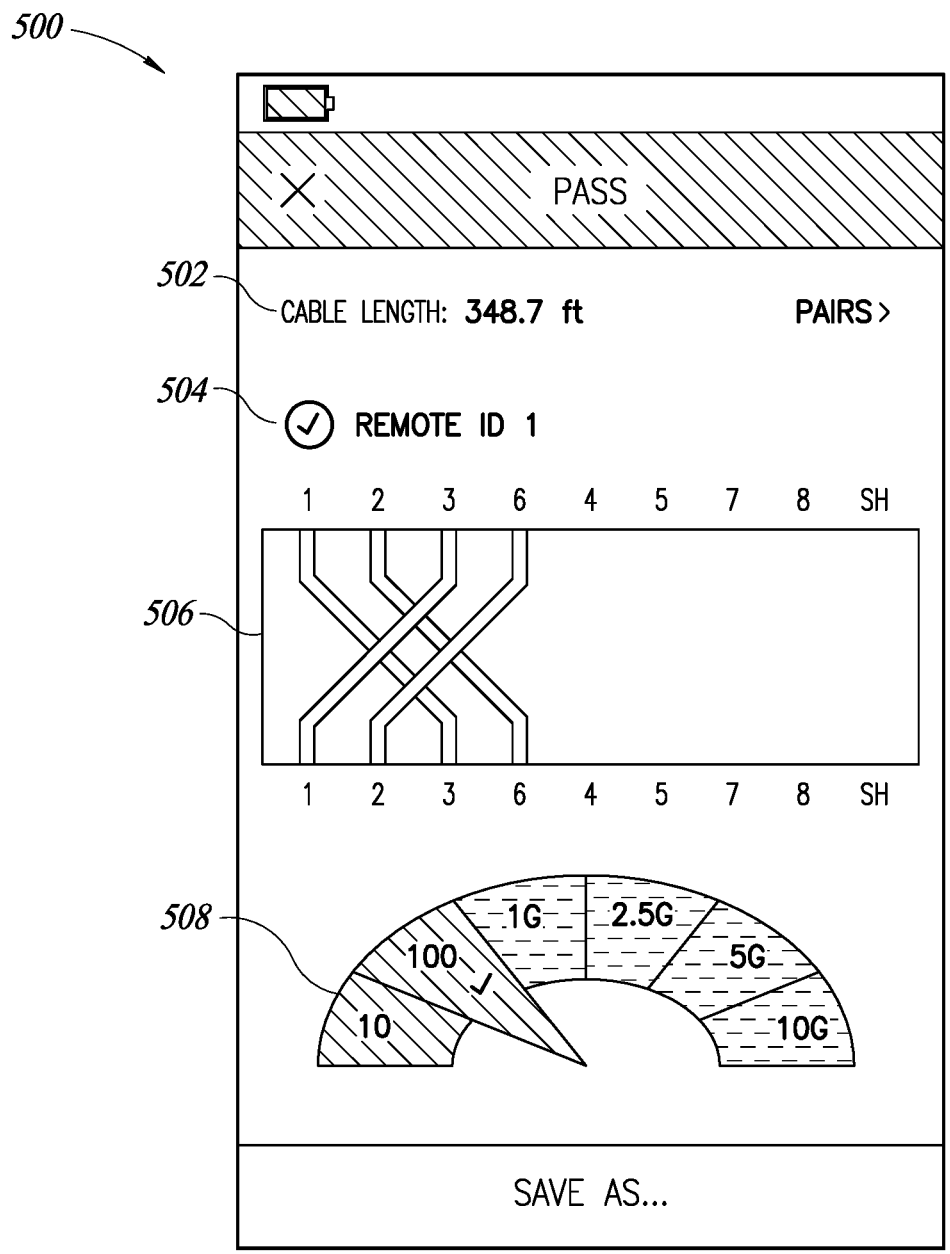
FIG. 5 depicts another embodiment of a network test interface generated in accordance with the present disclosure.

FIG. 5 illustrates yet another example of a network test interface 500. In this example, the wire map test results 506 indicate a network cabling that includes two pairs of wires (four wires total) connected to the apparatus 100 and properly terminated at the far end of the network cabling. The network test interface 500 also includes an indication 502 of the length of the wire pairs in the network cabling and an indication 504 of the remote ID circuitry coupled to the far end of the network cabling. The indication 504 includes a checkmark that confirms proper connection of the remote ID circuitry and specifically identifies the remote ID circuitry ("Remote ID 1") as detected.

The four wire configuration indicated by the wire map test results 506 can be tested by network tests according to the 10 and 100 standards, but not the more rigorous 1G, 2.5G, 5G, or 10G standards. Further, the network test interface 500 shows a plurality of test reports 508 indicating that the network tests for the 10 and 100 standards were conducted and passed (thus being shown, e.g., in green), with the network test for the 100 standard being the user-selected network test. Network tests 1G, 2.5G, 5G, and 10G were not conducted and thus are indicated with a different appearance (e.g., in gray).

Figure 6:
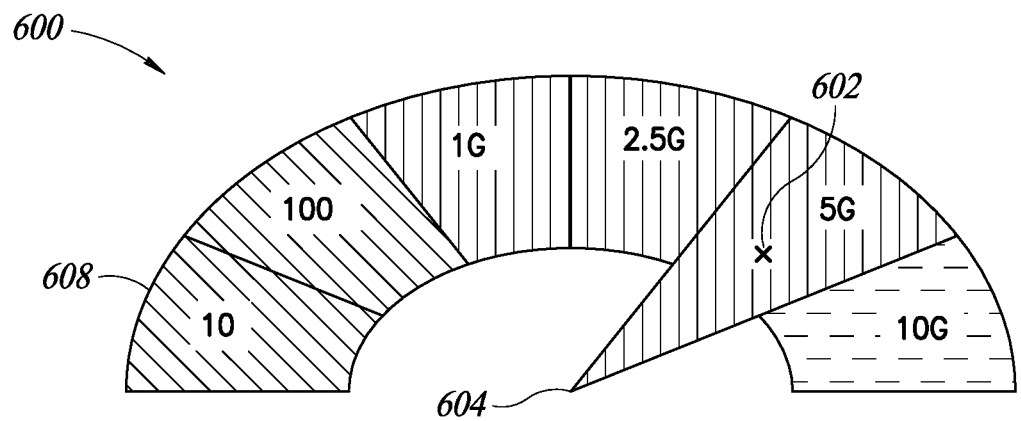
FIG. 6 depicts a plurality of test reports that may be included in a network test interface generated in accordance with the present disclosure.
Figure 7:
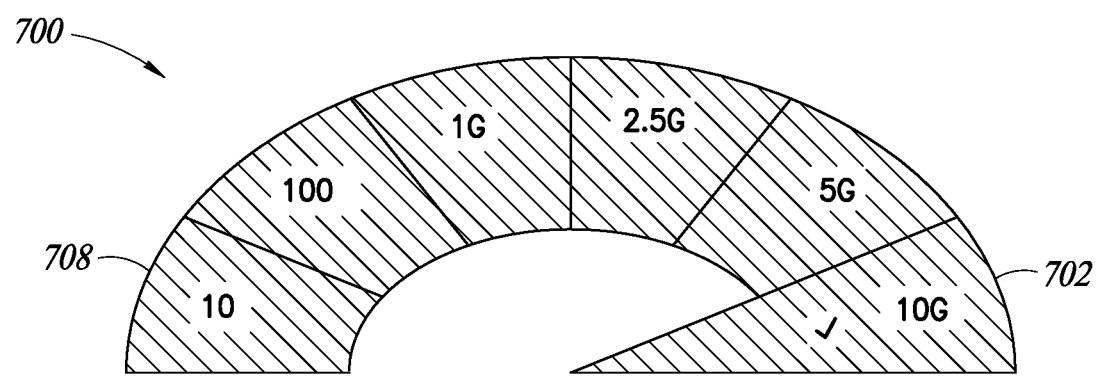
FIG. 7 depicts another plurality of test reports that may be included in a network test interface generated in accordance with the present disclosure.

FIGS. 6 and 7 illustrates further examples 600, 700 of a plurality of test reports 608, 708 that may be included in a network test interface generated in accordance with the present disclosure. In the plurality of test reports 608, the network test 5G is depicted as being the user-selected network test, as indicated by the additional graphical indication 602 extending from the 5G test report to the common center portion 604 of the plurality of test reports 608. In this example, the network tests 10 and 100 appear different (e.g. in a different color) than the 1G, 2.5G, and 5G network tests, and further different than the 10G network test. In this example, the network tests 10 and 100 were conducted and passed (thus appearing in a green color, for example), while the network tests 1G, 2.5G, and 5G were conducted and failed (appearing in a red color, for example). In this example, as noted, the user had selected the 5G network test, but the network cabling failed the 5G network test. The failure to meet the 5G network test is further specifically indicated by an "X" indication 602 positioned within the test report for the 5G network test. Having determined that the network cabling failed the 5G network test (i.e., the 5G network test is a non-passing network test), the apparatus in this example automatically conducted network tests having less rigor, namely the 2.5G, 1G, 100, and 10 network tests, and discovered that, while the network cabling was able to pass the set of test requirements for each of the 10 and 100 network tests (with the corresponding test reports being shown in, e.g., green), the network cabling failed to meet the set of test requirements for each of the 1G and 2.5G network tests (with the corresponding test reports being shown in, e.g., red).

Turning to FIG. 7, the plurality of test reports 708 indicates that the network cabling passed the user-selected 10G network test. This passing of the 10G network test may be indicated by a checkmark positioned within the 10G test report 702. In addition to indicating that the plurality of test reports 708 passed the 10G network test, the plurality of test reports 708 further indicate that the network cabling passed all of the network tests having less rigor, namely the 10, 100, 1G, 2.5G, and 5G network tests. The apparatus in this example automatically conducted the 10, 100, 1G, 2.5G, and 5G network tests, e.g., to confirm that the network cabling was able to pass all of the plurality of network tests. In some embodiments, conducting some or all of the network tests means that the processing circuitry 104 of the apparatus 100 (see, e.g., FIG. 1) has evaluated the common set of test results produced by the test circuitry 106 with respect to the set of test requirements of each of the 10, 100, 1G, 2.5G, 5G, and 10G network tests. In other embodiments, conducting all of the network tests means that the processing circuitry 104 has evaluated the common set of test results only with respect to the test requirements of one of the network tests (here, the user-selected 10G network test) and having determined that the network cabling passed the user-selected network test, the processing circuitry 104 infers that the common set of test results also meets the less rigorous set of test requirements for each of the lower speed 10, 100, 1G, 2.5G, and 5G standards. In this manner, the processing circuitry 104 conducts each of the plurality of network tests by explicitly conducting the user-selected 10G network test, and implicitly conducting the less rigorous 10, 100, 1G, 2.5G, and 5G network tests based on having passed the more rigorous 10G network test.

Figure 8:
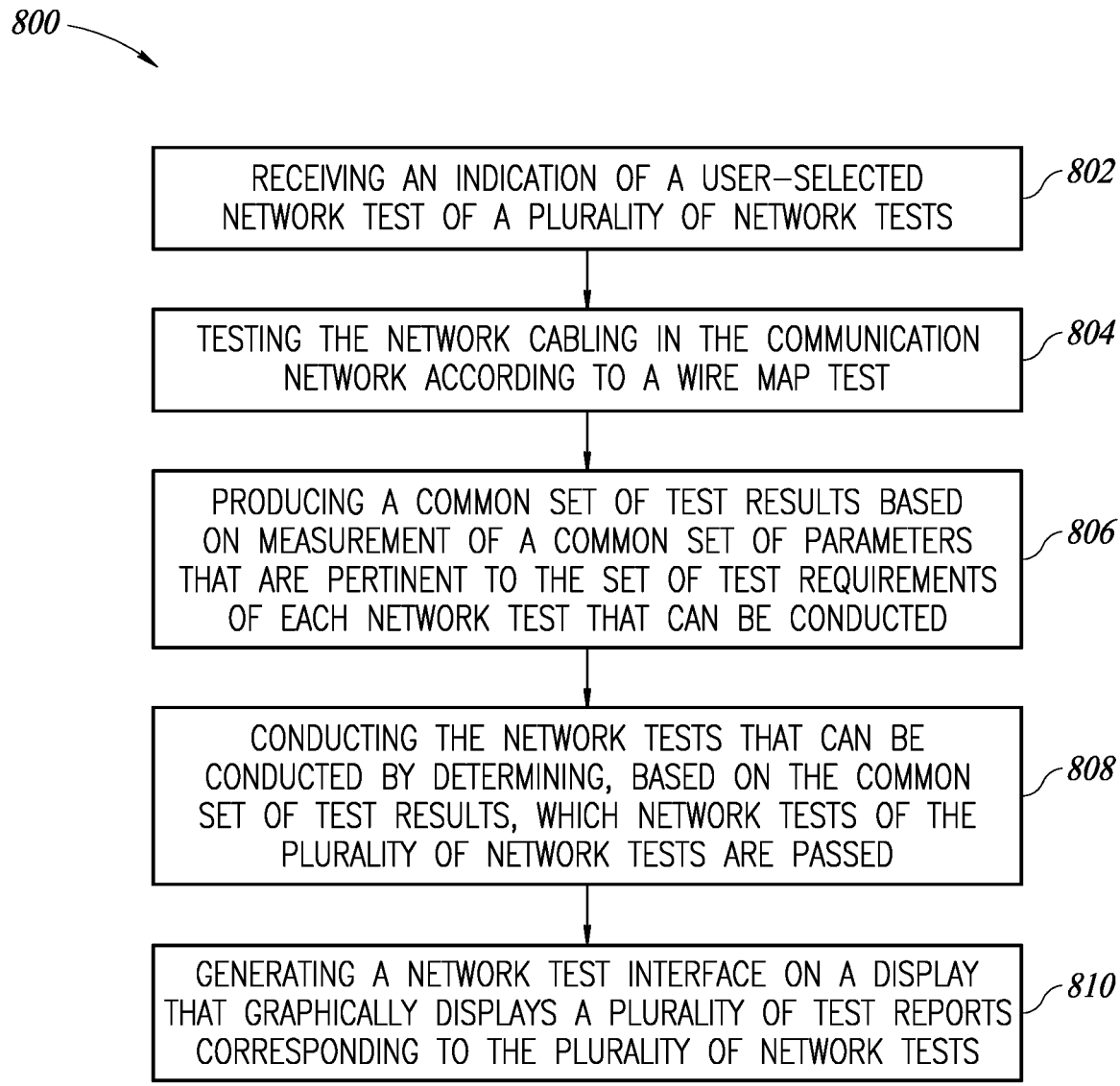
FIG. 8 is a flow diagram of a method for testing network cabling in a communication network in accordance with the present disclosure.

Also described herein, in various embodiments, are methods for testing network cabling in a communication network. In at least one embodiment, as illustrated by the method 800 shown in FIG. 8, the method includes receiving an indication of a user-selected network test of a plurality of network tests, as indicated at block 802. In this regard, respective network tests in the plurality of network tests include respective sets of test requirements with different levels of rigor. In other words, in at least some embodiments, each network test of the plurality of network tests includes a set of test requirements that must be satisfied for the network cabling to pass the respective network test, and further, the set of test requirements of each network test has a different level of rigor to satisfy in order to pass the respective network test as compared to other network tests in the plurality of network tests.

The method 800 continues at block 804 by testing the network cabling in the communication network according to a wire map test. The wire map test is indicative of which network tests of the plurality of network tests can be conducted on the network cabling. This testing of the network cabling includes producing a common set of test results based on measurement of a common set of parameters that are pertinent to the set of test requirements of each network test that can be conducted according to the wire map test, as indicated at block 806.

At block 808, the method evaluates the common set of test results with respect to the respective sets of test requirements to determine one or more passing network tests. For example, in this regard, the method includes conducting the network tests that can be conducted by determining, based on the common set of test results, which network tests of the plurality of network tests are passed. This step of determining includes evaluating the common set of test results with respect to the set of test requirements of each network test being conducted.

Lastly, at block 810, a network test interface is generated on a display. The network test interface graphically displays a plurality of test reports corresponding to the plurality of network tests. Each test report of the plurality of test reports indicates whether the corresponding network test is one of the one or more passing network tests. Preferably, this includes the user-selected network test.

Methods may further include any or all of the following additional features. In various cases, at least one of the test reports displayed in the network test interface may indicate whether the network cabling passed a network test having a greater level of rigor than the user-selected network test, that is, whether the network test having a greater level of rigor than the user-selected network test is one of the one or more passing network tests.

In various cases, the methods may further comprise displaying, in the network test interface, an additional element that further specifically indicates whether the user-selected network test is one of the one or more passing network tests.

In various cases, the network test interface may be generated with a single view in which the plurality of test reports are graphically positioned on the display in a sequence according to an increasing or decreasing level of rigor of the respective sets of test requirements of the respective network tests in the plurality of network tests. The plurality of test reports may be graphically positioned along a curve having a common center portion. The network test interface is generated such that the test report corresponding to each network test that is passed appears different than test reports of network tests that are not passed.

In various cases, the methods may further comprise displaying, in the network test interface, an additional graphical indication specifically indicating which test report of the plurality of test reports corresponds to the user-selected network test. The additional graphical indication may graphically extend from the test report corresponding to the user-selected network test toward the common center portion.

In various cases, the network test interface may be generated such that a test report corresponding to a network test that is not conducted appears different than test reports of network tests that are conducted. In various cases, the common set of test results may be produced independent of the network test that is the user-selected network test.

In various cases, the method may further comprise automatically conducting one or more network tests of the plurality of network tests, in addition to the user-selected network test. The one or more additional network tests conducted on the network cabling may have a set of test requirements with a higher level of rigor than the network test selected by the user. Alternatively, or in addition, the one or more additional network tests conducted on the network cabling may have a set of test requirements with a lower level of rigor than the network test selected by the user. In some cases, the step of evaluating the common set of test requirements may be stopped when the evaluating determines a non-passing network test.

In some cases, the test circuitry, the processing circuitry, the memory, the user interface, and the display are all arranged on or within the same housing of the apparatus conducting the network testing. Alternatively, in some cases, the test circuitry is remote from the processing circuitry and the communication circuitry communicates the test results to the processing circuitry via a wired or wireless communication channel.

In some cases, the foregoing method elements may be performed by one or more processors of a computing device that implements the processing circuitry and the test circuitry described in FIG. 1. A computer-readable medium, such as the memory 112 as described in FIG. 1, may contain executable instructions for testing network cabling in a communication network as described in any of the embodiments above. When the executable instructions are executed, the instructions cause the one or more processors to implement the method elements described herein.

The various embodiments and examples described above can be combined and/or modified to provide yet further embodiments. These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled.

The invention claimed is:

1. A method for testing network cabling in a communication network, comprising:
   receiving an indication of a user-selected network test of a plurality of network tests, wherein respective network tests in the plurality of network tests include respective sets of test requirements, and wherein the respective sets of test requirements have different levels of rigor as evaluated with respect to a common set of test results;
   testing the network cabling in the communication network according to a wire map test, wherein the wire map test is indicative of which network tests of the plurality of network tests can be conducted on the network cabling, and wherein said testing the network cabling includes producing the common set of test results based on measurement of a common set of parameters that are pertinent to the set of test requirements of each network test that can be conducted according to the wire map test;
   evaluating the common set of test results with respect to the respective sets of test requirements to determine one or more passing network tests; and
   generating a network test interface on a display, wherein the network test interface graphically displays a plurality of test reports corresponding to the plurality of network tests, wherein each test report of the plurality of test reports indicates whether the corresponding network test is one of the one or more passing network tests.

2. The method of claim 1, wherein at least one test report displayed in the network test interface indicates whether a network test having a greater level of rigor than the user-selected network test is one of the one or more passing network tests.

3. The method of claim 1, further comprising displaying, in the network test interface, an additional element that specifically indicates whether the user-selected network test is one of the one or more passing network tests.

4. The method of claim 1, wherein the network test interface is generated with a single view in which the plurality of test reports are graphically positioned on the display in a sequence according to an increasing or decreasing level of rigor of the respective sets of test requirements.

5. The method according to claim 4, wherein the plurality of test reports are graphically positioned along a curve having a common center portion, and wherein the network test interface is generated such that the test report corresponding to each network test that is passed appears different than test reports of network tests that are not passed.

6. The method according to claim 5, further comprising displaying, in the network test interface, an additional graphical indication specifically indicating which test report of the plurality of test reports corresponds to the user-selected network test.

7. The method according to claim 6, wherein the additional graphical indication graphically extends from the test report corresponding to the user-selected network test toward the common center portion.

8. The method according to claim 1, further comprising stopping the evaluating when the evaluating determines a non-passing network test.

9. The method according to claim 1, wherein the common set of test results is produced independent of which network test is the user-selected network test.

10. An apparatus for testing network cabling in a communication network, comprising:
processing circuitry configured to receive an indication of a user-selected network test of a plurality of network tests, wherein respective network tests in the plurality of network tests include respective sets of test requirements, the respective sets of test requirements having different levels of rigor as evaluated with respect to a common set of test results;
test circuitry configured to test the network cabling according to a wire map test, wherein the wire map test is indicative of which network tests of the plurality of network tests can be conducted on the network cabling, the test circuitry producing the common set of test results based on measurement of a common set of parameters that are pertinent to the set of test requirements of each network test that can be conducted according to the wire map test,
wherein the processing circuitry is further configured to evaluate the common set of test results with respect to the respective sets of test requirements to determine one or more passing network tests; and
a display configured to receive one or more signals that cause the display to generate a network test interface, wherein the network test interface includes a graphical display of a plurality of test reports corresponding to the plurality of network tests, wherein each test report of the plurality of test reports indicates whether the corresponding network test is one of the one or more passing network tests.

11. The apparatus of claim 10, wherein the network test interface generated by the display includes at least one test report indicating whether a network test having a greater level of rigor than the user-selected network test is one of the one or more passing network tests.

12. The apparatus of claim 10, wherein the network test interface generated by the display includes an additional element that specifically indicates whether the user-selected network test is one of the one or more passing network tests.

13. The apparatus of claim 10, wherein the display is configured to generate the network test interface with a single view in which the plurality of test reports are graphically positioned in a sequence according to an increasing or decreasing level of rigor of the respective sets of test requirements.

14. The apparatus of claim 13, wherein the plurality of test reports are graphically positioned along a curve having a common center portion, and wherein the display is configured to generate the network test interface such that the test report corresponding to each network test that is passed appears different than test reports of network tests that are not passed.

15. The apparatus of claim 14, wherein the display is configured to generate the network test interface with an additional graphical indication that specifically indicates which test report of the plurality of test reports corresponds to the user-selected network test, and wherein the additional graphical indication graphically extends from the test report corresponding to the user-selected network test toward the common center portion.

16. The apparatus of claim 10, further comprising communication circuitry coupled to the test circuitry, wherein the test circuitry is located remote from the processing circuitry and the communication circuitry is configured to communicate the common set of test results to the processing circuitry via a data communication channel.

17. The apparatus of claim 10, wherein the processing circuitry is configured to stop evaluating the common set of test results when the evaluating determines a non-passing network test.

18. The apparatus of claim 10, wherein the test circuitry is configured to produce the common set of test results independent of which network test is the user-selected network test.

19. The apparatus according to claim 10, wherein the display is configured to generate the network test interface such that each test report of the plurality of test reports in the network test interface includes a label identifying the network test that corresponds to the test report.

20. A computer-readable medium containing executable instructions for testing network cabling in a communication network, wherein the executable instructions, when executed by one or more processors, cause the one or more processors to:
receive an indication of a user-selected network test of a plurality of network tests, wherein respective network tests in the plurality of network tests include respective sets of test requirements with different levels of rigor as evaluated with respect to a common set of test results;
test the network cabling in the communication network according to a wire map test, wherein the wire map test is indicative of which network tests of the plurality of network tests can be conducted on the network cabling, and wherein testing the network cabling includes producing the common set of test results based on measurement of a common set of parameters that are pertinent to the set of test requirements of each network test that can be conducted according to the wire map test;

evaluate the common set of test results with respect to the respective sets of test requirements to determine one or more passing network tests; and generate a network test interface on a display, wherein the network test interface graphically displays a plurality of test reports corresponding to the plurality of network tests, wherein each test report of the plurality of test reports indicates whether the corresponding network test is one of the one or more passing network tests.

* * * * *